(12) United States Patent
Caball et al.

(10) Patent No.: US 7,881,374 B2
(45) Date of Patent: Feb. 1, 2011

(54) METHOD AND APPARATUS FOR 3-D SUBBAND VIDEO CODING

(75) Inventors: Jordi Caball, Bramley (GB); Leszek Cieplinski, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1546 days.

(21) Appl. No.: 10/927,069

(22) Filed: Aug. 27, 2004

(65) Prior Publication Data
US 2005/0053132 A1 Mar. 10, 2005

(30) Foreign Application Priority Data
Sep. 9, 2003 (EP) .................................. 03255624

(51) Int. Cl.
H04N 7/12 (2006.01)
H04N 11/02 (2006.01)

(52) U.S. Cl. ............................. 375/240.11; 375/240.26

(58) Field of Classification Search ..............................
375/240.01–240.06, 240.12–240.16, 240.26
See application file for complete search history.

(56) References Cited

U.S. PATENT DOCUMENTS

| 5,841,473 | A | * | 11/1998 | Chui et al. | ................ | 348/390.1 |
| 5,995,668 | A | * | 11/1999 | Corset et al. | ................. | 382/233 |
| 6,381,276 | B1 | * | 4/2002 | Pesquet-Popescu | .... | 375/240.11 |
| 6,519,284 | B1 | | 2/2003 | Pesquet-Popescu et al. | | |
| 7,020,335 | B1 | * | 3/2006 | Abousleman | ................ | 382/199 |
| 7,023,923 | B2 | * | 4/2006 | Turaga et al. | ........... | 375/240.19 |
| 7,042,946 | B2 | * | 5/2006 | Turaga et al. | ........... | 375/240.19 |
| 7,653,133 | B2 | * | 1/2010 | Woods et al. | ........... | 375/240.13 |
| 2002/0064231 | A1 | | 5/2002 | Felts et al. | | |

FOREIGN PATENT DOCUMENTS

WO WO 02/01881 A2 1/2002
WO WO 02/085026 A1 10/2002

OTHER PUBLICATIONS

IEEE Transactions on Signal Processing, Dec. 1993, vol. 41, No. 12, "Embedded Image Coding Using Zerotrees of Wavelet Coefficients," J.M. Shapiro, pp. 3445-3462.
Proceedings of the Picture Coding Symposium, DD, Apr. 21, 1999, "3-D Medical Image Compression Using an Adaptive Mode Selection Technique in Wavelet Transform Domain," H.D. Cho et al., pp. 91-94, XP-008005041.
Proceedings 2001 International Conference on Image Processing ICIP 2001, Oct. 7-10, 2001, "A Fully Scalable 3D Subband Video Codec," V. Bottreau et al., pp. 1017-1020.
IEEE Comput. Soc., Nov. 2, 1997, "Directional Zerotrees Image Coding," V. Areekul et al., pp. 684-688.

(Continued)

*Primary Examiner*—David Czekaj
(74) *Attorney, Agent, or Firm*—Birch, Stewart, Kolasch & Birch, LLP.

(57) ABSTRACT

A method of encoding and decoding a sequence of frames uses 3-D subband decomposition involving temporal filtering. Under certain conditions, for at least one pixel, the value of said pixel is approximated using one or more pixel values in the same frame.

16 Claims, 3 Drawing Sheets

OTHER PUBLICATIONS

Proceedings 2000 International Conference in Image Processing ICIP 2000, vol. 1, Sep. 10, 2000, "Efficient Content Modeling in Scalable 3D Wavelet-Based Video Compression," B. Felts, pp. 1004-1007.

IEEE Transactions on Image Processing, vol. 3, No. 15, Sep. 1, 1994, "Three-Dimensional Subband Coding with Motion Compensation," J.-R. Ohm, pp. 559-571.

"A Really Friendly Guide to Wavelets," C. Valens, 1999.

"Compressing Still and Moving Images with Wavelets," M.L. Hilton et al., Apr. 18, 1994.

Proc. IEEE Int. Conf. Image Proc., Oct. 2001, "Motion-compensated highly scalable video compression using an adaptive 3D wavelet transform based on lifting," A. Secker et al., pp. 1029-1032.

SPIE Conf. on Visual Communications and Image Processing, 1999, "Invertible Three-Dimensional Analysis/Synthesis System for Video Coding with Half-Pixel-Accurate Motion Compensation," S.-T. Hsiang et al.

"Text of ISO/IEC FDIS 14496-10: Information Technology—Coding of Audio-Visual Objects—Part 10: Advanced Video Coding/H. 264," T. Wiegand et al., 2003, pp. 97-107.

Derwent Publication No. XP-010563939 of Vincent Bottreau et al., A Fully Scalable 3D Subband Codec, 2001, pp. 1017-1020.

IEEE Trans. Image Processing, vol. 8, No. 2, pp. 155-167, Feb. 1999, "Motion-Compensated 3-D Subband Coding of Video," Choi et al.

* cited by examiner

| | $t(0,-1)$ | $t(1,-1)$ | $t(2,-1)$ | $t(3,-1)$ |
|---|---|---|---|---|
| $l(-1,0)$ | $c(0,0)$ | $c(1,0)$ | $c(2,0)$ | $c(3,0)$ |
| $l(-1,1)$ | $c(0,1)$ | $c(1,1)$ | $c(2,1)$ | $c(3,1)$ |
| $l(-1,2)$ | $c(0,2)$ | $c(1,2)$ | $c(2,2)$ | $c(3,2)$ |
| $l(-1,3)$ | $c(0,3)$ | $c(1,3)$ | $c(2,3)$ | $c(3,3)$ |

METHOD AND APPARATUS FOR 3-D SUBBAND VIDEO CODING

This Non-provisional application claims priority under 35 U.S.C. §119(a) on patent application Ser. No(s). 03255624.3 filed in European Community on Sep. 9, 2003, the entire contents of which are hereby incorporated by reference.

The invention relates to a method of encoding and decoding a sequence of images. The invention is especially related to 3-D subband coding involving temporal filtering followed by spatial filtering.

The papers "Three-Dimensional Subband Coding with Motion Compensation" by Jens-Rainer Ohm and "Motion-Compensated 3-D Subband Coding of Video" by Choi and Woods are background references describing 3-D subband coding. Briefly, a sequence of images, such as a Group of Pictures (GOP), in a video sequence, are decomposed into spatiotemporal subbands by motion compensated (MC) temporal analysis followed by a spatial wavelet transform. The resulting subbands (coefficients) are further encoded for transmission.

An example of a 3-D subband coding system is described in more detail below, with reference to FIGS. 1 and 2.

FIG. 1 is a block diagram of a motion compensated embedded zeroblock coder (MC-EZBC), which is an example of a 3-D subband coder. The coder includes a motion compensation temporal filtering (MCTF) module 10. The output of the MCTF module 10 is connected to a spatial transform module 12 and a motion estimation module 18. The output of the spatial transform module is connected to a embedded zeroblock (EZBC) module 14. An output of the motion estimation module 18 is input to the MCTF module 10 and another output is connected to a motion vector coding module 20. The outputs of the EZBC module 14 and the motion vector coding module 20 are both connected to a packetisation module 16, which outputs compressed video data to be transmitted.

A GOP (typically 16 frames) is input to the MCTF module 10, where MCTF is performed. Together with the motion estimation module 18, motion estimation is carried out on the frames. In this example, motion estimation is backward motion estimation using hierarchical variable size block matching (HVSBM). In this scheme, motion estimation is first performed with large blocks (64×64 pixels). Each block is then divided into four sub-blocks. Motion vectors for sub-blocks are generated by refining the motion vector of the larger block. This is repeated until a minimum block size (4×4) pixels is reached. After performing the pruning process in rate-distortion optimisation a grid of variable block sizes is obtained and the resulting motion vectors are assigned to all pixels in the corresponding blocks.

Next, the MCTF module 10 carries out temporal filtering, using the motion vectors input from the motion estimation module 18. In this example, temporal filtering is implemented using a Haar temporal wavelet transform (lifting scheme), which produces a hierarchical temporal decomposition, as shown in FIG. 2

More specifically, with reference to FIG. 2, each consecutive pair of frames A and B in the GOP is operated on using suitable transforms to produce a low pass filtered frame and a high pass filtered frame, to produce a first level subband. For the GOP, this produces 8 low pass filtered (t-L) frames and 8 high pass filtered frames (t-H).

The procedure (motion estimation and transforms) is repeated using the low pass filtered frames, to produce four low pass filtered frames (t-LL) and four high pass filtered frames (t-LH). Similarly, the procedure is repeated recursively on the low temporal subband until there is only one low temporal subband frame left. As shown in FIG. 2, this results in four level decomposition with 1 t-LLLL frame, 1 t-LLLH frame, 2 t-LLH and t-LLL frames, 4 t-LL and t LH frames, and 8 t-H and t-L frames.

Spatial decomposition follows the temporal stage, in the spatial transform module 12. More specifically, each temporal subband frame highlighted in the decomposition shown in FIG. 2 is subjected to spatial filtering and decomposition using a wavelet transform. The paper "Embedded Image Coding using Zerotrees of Wavelets Coefficients" by J. M. Shapiro December 1993, describes the application of wavelet transforms to image frames. Briefly, spatial decomposition results in a hierarchical decomposition similar to the structure shown in FIG. 2 for the temporal filtering.

Overall, the spatiotemporal filtering results in a hierarchical array of filtered frames, each frame consisting of coefficients for each pixel location.

U.S. Pat. No. 6,519,284 illustrates and describes hierarchical subband encoding.

The 3-D subband coefficients are spatially coded in the EZBC module 14. All spatiotemporal subbands are coded separately.

The motion vector fields output by the motion estimation module 18 are encoded by the motion vector coding module 20 using lossless prediction and adaptive arithmetic coding.

The packetisation module combines the encoded subband coefficients and the encoded motion vector fields. In bitplane scanning to form the final output bitstream, the spatial subbands of all temporal subband frames of a GOP are interleaved. The motion vector part of the bitstream is stored separately in a non-scalable fashion.

In the motion estimation steps mentioned above, a motion vector is allocated to each pixel of the predicted/current frame (for successive frames A and B, with backward motion estimation, the predicted frame is frame B, and the reference frame is frame A, as shown in FIG. 3). The motion vector may or may not represent a good match between the pixel in frame B and the pixel in frame A, based on the displaced frame differences (DFD) ie the difference in pixel values for the pixel in frame B and the corresponding pixel in frame A identified by the motion vector. Temporal filtering using two badly matched pixels results in problems including DFD with high energy and lower frame rate video of poor visual quality.

The main problem with motion compensation is that the relationship between frames cannot always be perfectly described by a motion model. For block-based models, this is true whenever motion is not piecewise translational, as may occur in the event of occlusion, camera zoom or pan, etc. In such areas, the pixels can be classified as unconnected (uncovered, motion vector uncertain) or multi-connected (covered, several pixels in frame B may have motion vectors pointing to the same pixel in frame A). Motion compensation cannot be expected to be efficient in such disconnected regions.

To avoid motion filtering between badly matched pixels, the DFDs between corresponding pixels in frame A and B are compared with a predetermined threshold. For a pixel where the allocated motion vector results in a DFD above the threshold, the motion vector is considered bad, and the pixel is treated as unconnected (motion vector uncertain). For example, pixels with larger DFD mean square error (MSE) than their scaled variances are classified as unconnected.

For multi-connected pixels (pixels in frame A which have several corresponding pixels in the predicted frame, frame B), the absolute DFD value is computed for each motion vector, and the motion vector and associated pixel in frame B with the minimum associated DFD is selected. The other pixels in frame B pointing to the same pixel in frame A are treated as unconnected.

In FIG. 3, pixels b8 and a2 are unconnected, pixel a5 is multiconnected, and the remaining pixels are connected. Supposing the DFD for a5/b4 is greater than the DFD for a5/b5, then the motion vector between a5 and b5 is retained, and b4 is treated as unconnected.

The problem of multiconnected and unconnected pixels is discussed in the Ohm and Choi and Woods papers mentioned above, as well as in WO02/085026 and U.S. Pat. No. 6,381,276, which also illustrates covered/uncovered image areas.

Details of the Haar temporal wavelet transform mentioned above are set out below.

For two successive frames A and B, the high pass filtering is given by $$H(m,n) = (\sqrt{2}/2) * [B(m,n) - A(m-k, n-l)],$$

where A (reference frame) and B (current frame) are the original frames and H is the high pass-filtered frame, m and n index the pixels and k and l are the motion vectors.

The low pass filtering is adapted for connected pixels, $$L(m,n) = H(m+k, n+l) + \sqrt{2} * A(m,n),$$

and for unconnected (covered/uncovered) pixels $$L(m,n) = \sqrt{2} * A(m,n),$$

At the decoder, by using L and H, the same interpolation is performed on H to reconstruct A for connected pixels exactly as $$A(m,n) = (1/\sqrt{2}) * [L(m,n) - H(m+k, n+l)],$$

and for unconnected (covered/uncovered) pixels as $$A(m,n) = (1/\sqrt{2}) * L(m,n)$$

After A is available, the same interpolation can be performed on A to reconstruct B exactly as $$B(m,n) = \sqrt{2} * H(m,n) + A(m-k, n-l)$$

To encode unconnected blocks, the prior art algorithm performs forward motion estimation on the segmented unconnected blocks. If this results in lower DFD for a particular block, forward motion-compensated prediction (MCP) is used. Otherwise the default backward MCP is used. This gives three coding modes:

DEFAULT (connected blocks)
INTRA (unconnected blocks using backward MCP)
REVERSE (unconnected blocks using forward MCP)

The three cases are represented using a three-symbol Huffman code 0, 10 and 11 respectively, which is transmitted as overhead information along with the motion vectors. Since MCP is used instead of MCTF for INTRA and REVERSE blocks, the blocks in the current frame originally chosen as INTRA and REVERSE blocks will not be low pass temporally filtered.

Variable length coding is used for encoding motion vectors, since the motion vectors are not uniformly distributed. The motion vectors are converted into bit stream by adaptive arithmetic coding of the vector differences.

The 3-D subband coefficients are coded using EZBC. EZBC is an embedded image coding algorithm using zeroblock coding and context modeling of subband/wavelet coefficients. Each frame is spatially coded separately and the resulting bitstream is passed to the packetisation module.

Alternative techniques (MPEG-2, MPEG-4, H.263, H.264) for coding image sequences include motion estimation/compensation and spatial transform coding. Some frames (I frames) are intra-coded without using motion estimation. Other frames (B and P frames) involve block motion compensation and spatial encoding of the resulting difference block. Block intra coding can also be carried out in B and P frames where no appropriate motion vector was found in the motion estimation. In order to increase the efficiency of intra coding, spatial correction between adjacent blocks in a given frame can be exploited. In particular, in the MPEG-4 AVC/H.264 codec, the block of interest can be predicted from the surrounding blocks according to their directional information. The difference between the actual block and its prediction is then coded and no motion vector for this block needs to be coded and transmitted.

One of the problems of MC-EZBC and interframe wavelet coders in general is relatively poor performance at lower bit rates, mainly caused by non-scalability of motion vectors.

Also, for example, in the current inter-frame wavelet video coding approach, poor matches between adjacent frames are temporally filtered into the high pass temporal frames in the same way as the good matches using motion compensated prediction which leads to poor quality of those frame (or blocks within frames since for the poor matches where motion estimation could not find correspondences between adjacent frames the blocks used from the reference frame as prediction are significantly different from the blocks to be predicted.

Aspects of the invention are set out in the accompanying claims.

The invention provides a method of encoding and decoding a sequence of frames using 3-D subband decomposition involving temporal filtering, characterised by, under certain conditions, for at least one pixel, approximating or predicting the value of said pixel using the value of one or more other pixels in the same frame, in the temporaral decomposition. The temporal filtering involves deriving a motion vector field for a frame, and involving at least two frames in the temporal filtering. The approximated pixel value may be used to represent said pixel in either a high pass or a low pass frame in the (temporal) sub-band decomposition.

Preferably, said pixel is approximated using one or more neighbouring pixels in the same frame, or a combination thereof. For a given pixel, a neighbouring pixel may be any of the pixels immediately surrounding said pixel. Alternatively, for a pixel in a block of pixels, eg a 4×4 block, such as a block used in determining motion vectors eg in variable block size matching, or a block or group of pixels in which all the pixels in said group or block have the same motion vector, or a connected or segmented block or group of pixels, a neighbouring pixel may be considered a pixel adjoining or surrounding said block or group of pixels.

This "intra" prediction may be used, for example, for unconnected pixels, or when the DFD resulting from prediction using the same frame is lower than using motion compensated prediction. Otherwise, standard temporal filtering may be used.

In this specification, the term "frame" is used to describe an image unit, including after filtering, but the term also applies to other similar terminology such as image, field, picture, or sub-units or regions of an image, frame etc. The terms pixels and blocks or groups of pixels may be used interchangeably where appropriate.

An embodiment of the invention will be described with reference to the accompanying drawings, of which:

The invention can be implemented using a system similar to the prior art system described above, subject to modifications as described below.

Figure 1:
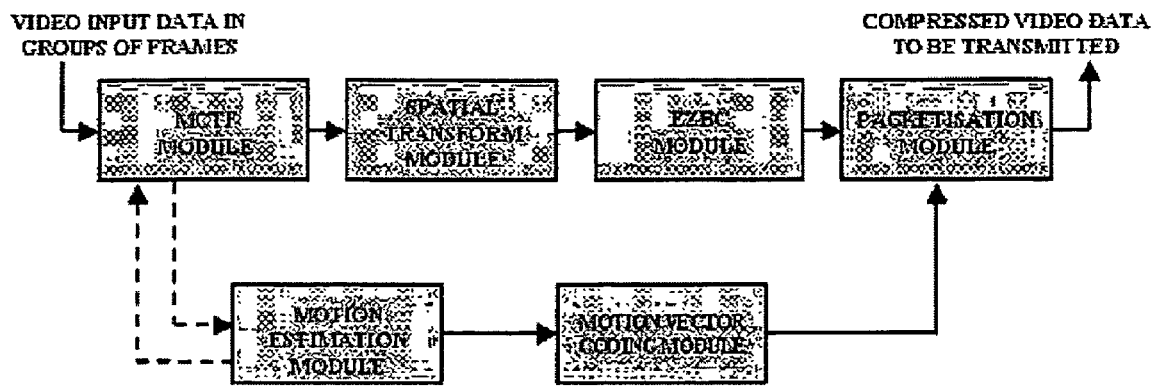
FIG. 1 is a block diagram of a encoding system.
Figure 2:
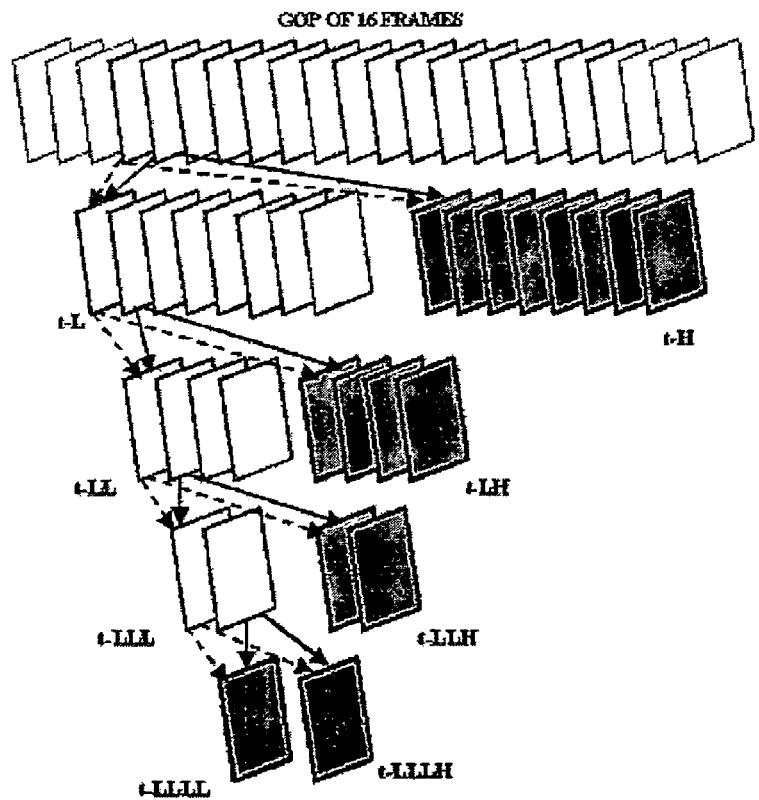
FIG. 2 is a diagram illustrating temporal decomposition of a GOP.
Figure 3:
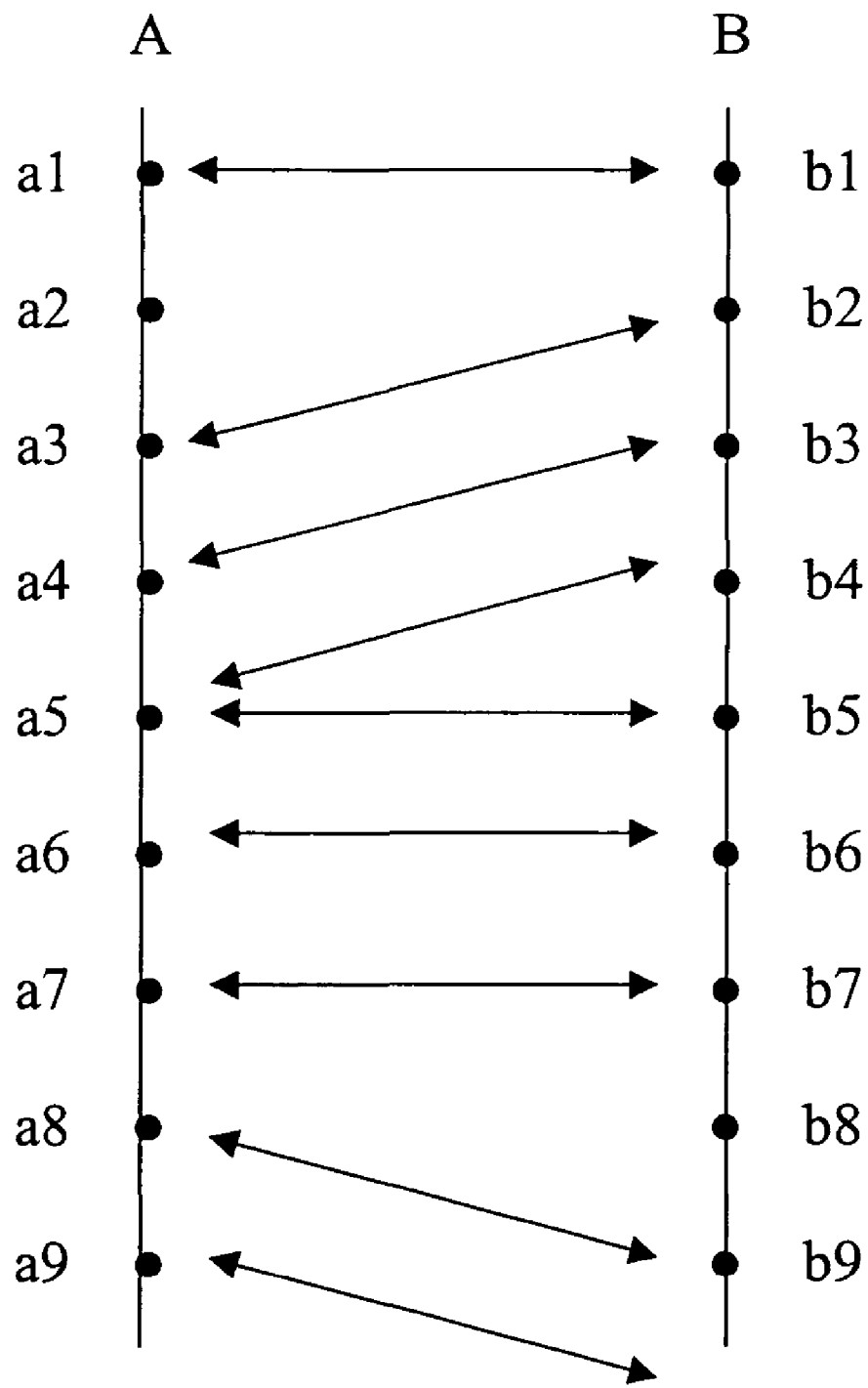
FIG. 3 is a representation of a pair of frames and connected and unconnected pixels.

Accordingly, the basic components of the coding system according to the present embodiment are as shown in FIG. 1, and operate as described above in relation to the prior art, except that the MCTF module is modified in relation to the processing of unconnected pixels or blocks of pixels.

Figures 4, 5:
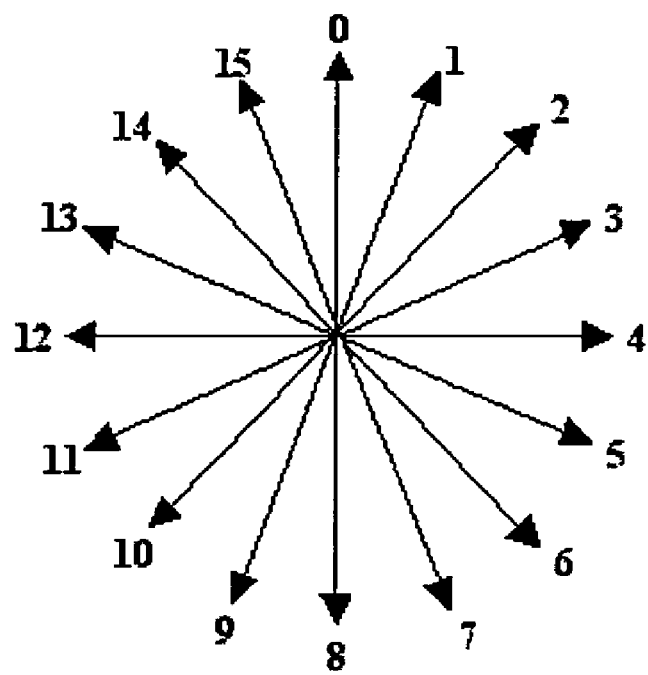
FIG. 4 is a diagram of an array of pixels in a frame.
FIG. 5 is a diagram illustrating directions for selecting prediction pixels.

As mentioned above, motion estimation is performed down to 4×4 pixel block size, and each pixel in the block is assigned the same motion vector. Such a 4×4 pixel block is illustrated in FIG. 4, with c(m,n) representing the pixels of the block under consideration. Neighbouring pixels are represented by t(p,q) for pixels in the row above the top row of the 4×4 block and by l(r,s) for pixels in the column to the left of the left column of the 4×4 block.

After determination of the motion vectors, the motion vectors and the associated DFDs are processed as in the prior art to determine which pixels should be treated as unconnected (as defined above).

For any pixel in the block which is unconnected, the pixel is approximated (or predicted) for further processing using a nearby pixel in the same frame, described as intra prediction in the following. This can be implemented in a number of ways.

In this example, there are three intra modes: vertical intra prediction mode, horizontal intra prediction mode and average horizontal-vertical intra prediction mode.

Vertical Intra Prediction Mode:
    c(0,0), c(0,1), c(0,2) and c(0,3) are predicted by t(0,−1)
    c(1,0), c(1,1), c(1,2) and c(1,3) are predicted by t(1,−1)
    c(2,0), c(2,1), c(2,2) and c(2,3) are predicted by t(2,−1)
    c(3,0), c(3,1), c(3,2) and c(3,3) are predicted by t(3,−1)

Horizontal Intra Prediction Mode:
    c(0,0), c(1,0), c(2,0) and c(3,0) are predicted by l(−1,0)
    c(0,1), c(1,1), c(2,1) and c(3,1) are predicted by l(−1,1)
    c(0,2), c(1,2), c(2,2) and c(3,2) are predicted by l(−1,2)
    c(0,3), c(1,3), c(2,3) and c(3,3) are predicted by l(−1,3)

Average Horizontal-Vertical Intra Prediction Mode:
    c(0,0) is predicted by (t(0,−1)+l(−1,0))/2
    c(1,0) is predicted by (t(1,−1)+l(−1,0))/2
    c(2,0) is predicted by (t(2,−1)+l(−1,0))/2
    c(3,0) is predicted by (t(3,−1)+l(−1,0))/2
    c(0,1) is predicted by (t(0,−1)+l(−1,1))/2
    c(1,1) is predicted by (t(1,−1)+l(−1,1))/2
    c(2,1) is predicted by (t(2,−1)+l(−1,1))/2
    c(3,1) is predicted by (t(3,−1)+l(−1,1))/2
    c(0,2) is predicted by (t(0,−1)+l(−1,2))/2
    c(1,2) is predicted by (t(1,−1)+l(−1,2))/2
    c(2,2) is predicted by (t(2,−1)+l(−1,2))/2
    c(3,2) is predicted by (t(3,−1)+l(−1,2))/2
    c(0,3) is predicted by (t(0,−1)+l(−1,3))/2
    c(1,3) is predicted by (t(1,−1)+l(−1,3))/2
    c(2,3) is predicted by (t(2,−1)+l(−1,3))/2
    c(3,3) is predicted by (t(3,−1)+l(−1,3))/2

The system can be set for which prediction mode is preferred. In that case, if the prediction value for the prediction mode being used is not available (eg if in vertical intra prediction mode, the relevant t(p,q) value is not available) then the system can be set to use an alternative prediction mode (eg horizontal prediction mode). If the prediction value for the other prediction mode is not available, then the prediction value of 128 is used.

When an intra-prediction mode is used, the motion-compensated temporal filtering (MCTF) is slightly modified in the lifting implementation for the corresponding blocks in two successive frames B (current) and A (reference). The high pass filtering H is adapted for unconnected pixels by $$H(m,n)=(\sqrt{2}/2)*[B(m,n)-B'(m,n)],$$

where B'(m, n) are the prediction pixels in the current frame, using intra prediction as mentioned above. The high pass filtering for connected pixels and the low pass filtering remain the same.

The current frame is then reconstructed for unconnected pixels by $$B(m,n)=\sqrt{2}*H(m,n)+B'(m,n),$$

where B'(m, n) are the previous reconstructed pixels. The remaining reconstruction equations remain unchanged.

By using this intra prediction approach, the high pass temporal frames are improved since the prediction values used may be closer to the pixel values to be predicted than when using the motion estimation process. To get the best results, the intra prediction modes are compared with MC prediction based on the motion estimation process and the mode (intra prediction or MC prediction) that leads to the lowest average distortion value is selected.

More specifically, the mean absolute difference (MAD) values for all intra prediction modes (vertical, horizontal and horizontal-vertical) and for MC prediction modes (backward and forward) are calculated. The mode with the lowest MAD value is selected as the best prediction mode.

In this embodiment, the same three-intra prediction modes are used for all the components, i.e. luminance (luma, Y) and chrominance (chroma, Cb and Cr), plus the original MCP mode depending on the level of distortion incurred by each mode.

By using a variable weighting parameter, the proportion of pixels/blocks using different modes can be varied. For example, setting the weighting parameter to 0 can mean that all unconnected pixels/blocks are predicted using pixels from the same frame as prediction values, and increasing the weighting parameter increases the proportion of pixels/blocks predicted using motion-compensation prediction.

The above intra prediction modes use only vertical, horizontal and average prediction. However, various other intra predictions could be used. For example, all the modes defined for the MPEG-4 AVC codec can be used. Those are nine intra prediction modes named vertical (mode 0), horizontal (mode 1), DC (mode 2), diagonal down/left (mode 3), diagonal down/right (mode 4), vertical right (mode 5), horizontal down (mode 6), vertical left (mode 7) and horizontal up (mode 8) prediction modes respectively. There are also four different intra prediction modes that can be applied for different block sizes and different colour components.

A complete set of prediction mode directions, as shown in FIG. 5, is described below:
    Mode 0: Vertical_Up
    Mode 1: Vertical_Up_Right
    Mode 2: Diagonal_Up_Right Mode 3: Horizontal_Up_Right
Mode 4: Horizontal_Right
Mode 5: Horizontal_Down_Right
Mode 6: Diagonal_Down_Right
Mode 7: Vertical_Down_Right
Mode 8: Vertical_Down
Mode 9: Vertical Down_Left
Mode 10: Diagonal_Down_Left
Mode 11: Horizontal_Down_Left
Mode 12: Horizontal_Left
Mode 13: Horizontal_Up_Left
Mode 14: Diagonal_Up_Left
Mode 15: Vertical_Up_Left
Mode 16: DC In motion estimation the selection of block size is based on rate-distortion optimisation. The intra prediction process is currently performed after motion estimation and is therefore not rate-distortion optimised. The intra-prediction mode selection could be incorporated into the rate-distortion optimisation.

A similar intra-prediction process could be introduced for the low pass-filtered frames.

Other types of 3-D decomposition and transforms may be used. For example, the invention could be applied in a decomposition scheme in which spatial filtering is performed first and temporal filtering afterwards.

The invention can be implemented for example in a computer based system, or using suitable hardware and/or software. A coder is shown in FIG. 1 and a corresponding decoder has corresponding components for performing the inverse decoding operations.

The invention claimed is:

1. A method of encoding a sequence of frames using one or more processors to perform 3-D sub-band decomposition involving motion compensated temporal filtering, the motion compensated temporal filtering comprising:
    deriving, using a processor, a motion vector field for a frame;
    identifying unconnected pixels;
    calculating, for at least one unconnected pixel, a plurality of approximated pixel values of said unconnected pixel, each approximated value being calculated based on a different set of one or more pixel values in the same frame as said unconnected pixel;
    comparing the difference between the actual value of said unconnected pixel and each calculated approximated value;
    selecting the approximated pixel value which is closest to the actual value of said unconnected pixel; and
    using the selected approximated pixel value in said temporal filtering for said unconnected pixel.

2. A method as claimed in claim 1 using three-dimensional (3D) sub-band decomposition involving temporal and spatial filtering.

3. A method as claimed in claim 1 wherein said approximated value of said unconnected pixel is calculated based only on one or more neighbouring pixels in the same frame as said unconnected pixel.

4. A method as claimed in claim 3 wherein vertically or horizontally neighbouring pixels in the same frame as said unconnected pixel are used as approximations.

5. A method as claimed in claim 1 further comprising approximating said unconnected pixel value using motion compensation and values in other frames than the unconnected pixel, comparing the results for approximations using pixels in other frames than the unconnected pixel and said approximations based on pixels in the same frame as the unconnected pixel, and selecting the best approximation.

6. A method as claimed in claim 1, wherein the approximated pixel value is used to represent said pixel in either a high pass or a low pass frame in the sub-band decomposition.

7. A method as claimed in claim 6 wherein said representation involves a transform equation, using said approximated pixel value, or said approximated pixel value and said pixel value.

8. A method as claimed in claim 1, wherein the different sets of one or more pixel values in the same frame as said unconnected pixel are defined by a corresponding plurality of directional prediction modes.

9. A method as claimed in claim 8, wherein the plurality of directional prediction modes comprise vertical, horizontal and horizontal-vertical.

10. A method as claimed in claim 8, wherein the plurality of directional prediction modes comprise Vertical_Up, Vertical_Up_Right, Diagonal_Up_Right, Horizontal_Up_Right, Horizontal_Right, Horizontal_Down_Right, Vertical_Down_Right, Vertical_Down, Vertical_Down_Left, Diagonal_Down_Left, Horizontal_Down_Left, Horizontal_Left, Horizontal_Up_Left, Diagonal_Up_Left, Vertical_Up_Left, and DC.

11. A method of encoding a sequence of frames using one ore more processors to perform 3-D subband decomposition involving motion compensated temporal and spatial filtering, wherein the 3-D subband decomposition involves for at least one unconnected pixel, calculating, using a processor, a plurality of approximated pixel values of said unconnected pixel, each approximated value being calculated based on a different set of one or more pixel values in the same frame as said unconnected pixel, comparing the difference between the actual value of said unconnected pixel and each calculated approximated value, selecting the approximated pixel value which is closest to the actual value of said unconnected pixel, and using the selected approximated pixel value in said motion compensated temporal and spatial filtering for said unconnected pixel.

12. A method of decoding a sequence of frames encoded using a method as claimed in claim 1 or claim 11, the method comprising reconstructing an unconnected pixel value in a frame using the value of at least one other pixel in the same frame as the unconnected pixel.

13. Coding and/or decoding apparatus adapted to implement a method as claimed in claim 1 or 11.

14. A computer-readable storage medium embodying a computer program for causing the computer to execute the method as claimed in any of claim 1 or 11.

15. Coding and/or decoding apparatus adapted to decode a sequence of frames encoded using a method as claimed in claim 1 or claim 11, the apparatus comprising a pixel value reconstructor for reconstructing an unconnected pixel value in a frame using the value of at least one other pixel in the same frame as the unconnected pixel.

16. A computer-readable storage medium embodying a computer program for causing the computer to decode a sequence of frames encoded using a method as claimed in claim 1 or claim 11, the computer program causing the computer to reconstruct an unconnected pixel value in a frame using the value of at least one other pixel in the same frame as the unconnected pixel.

* * * * *